United States Patent [19]

LaCount

[11] Patent Number: 4,869,161
[45] Date of Patent: Sep. 26, 1989

[54] CHEESE BRINER

[76] Inventor: Louis H. LaCount, 2860 Glenmore Rd., Green Bay, Wis. 54301

[21] Appl. No.: 31,689

[22] Filed: Mar. 25, 1987

[51] Int. Cl.[4] .................. A23C 19/00; A01J 25/00
[52] U.S. Cl. .................................. 99/455; 99/452; 99/535
[58] Field of Search ............... 99/452, 455, 453, 454, 99/460, 516, 534, 535; 426/36, 582, 512, 516, 518

[56] References Cited

U.S. PATENT DOCUMENTS

| | | | |
|---|---|---|---|
| 3,482,508 | 12/1969 | Bajcar et al. | 99/535 |
| 3,713,850 | 1/1973 | Gasbjerg | 99/535 X |
| 3,910,174 | 10/1975 | Nelles | 99/452 |
| 4,068,014 | 1/1978 | Heimbruch | 426/582 |
| 4,198,902 | 4/1980 | Worden | 99/535 |
| 4,206,238 | 6/1980 | Rothenbuhler | 426/36 |
| 4,339,468 | 7/1982 | Kielsmeier | 426/582 |
| 4,576,091 | 3/1982 | Muzzarelli | 99/455 |

FOREIGN PATENT DOCUMENTS 2328354 5/1977 France.

Primary Examiner—Timothy F. Simone
Attorney, Agent, or Firm—Recka, Joannes & Faller

[57] ABSTRACT

A hydraulic device incorporating open conduit flow used to brine and chill a cheese block, while transporting the cheese block from point of molding to a processing station;

A shallow tank is formed into an open conduit by parallel inner walls spaced far enough apart to allow passage of a cheese block; cold brine of a greater specific gravity than the cheese block is pumped into the tank and is directed through the open conduit in a circumscribed path to a brine outlet;

A cheese block placed in the tank at the brine inlet is carried through the open conduit in the circumscribed path by hydraulic flow; along the conduit fresh chilled brine is inserted and the stage of the conduit is varied to increase brine velocity at points along the conduit.

9 Claims, 7 Drawing Sheets

CHEESE BRINER

BACKGROUND OF THE INVENTION

1. Field of Invention

The invention is a cheese briner, which chills and brines a cheese block, in an open conduit, through which is pumped chilled brine at a salt saturation level that will float the cheese block. The floating cheese block is transported by the brine flow from the entrance of the conduit to the end of the conduit.

2. Background Art

Cheese curd formed in the cheese making process is heated in a cooker-molder until the curd melts; the melted curd is pumped into a stainless steel mold to form a block.

The stainless steel mold containing the melted curd is chilled to harden the outside of the cheese block; the block is then removed from the mold.

The block is taken to a refrigerated room in which tanks containing salt brine are kept.

The block is placed in the brining tank to reduce the block temperature, and to brine the cheese. Chilled salt brine is sprayed over the cheese brining tanks so that all surfaces of the cheese block are coated with brine.

Chilling of the block, by the refrigerated brine, is done to reduce the center core temperature of the cheese block to 55 degrees Fahrenheit, at which temperature the cheese can be processed. While the block is being chilled, the cheese block absorbs salt from the brine which displaces moisture in the cheese and flavors the cheese.

Some cheeses such as presalted mozzarella are brined for three or four hours. Other types of cheeses such as swiss, muenster and provolone are brined for 30 hours or more. An example of a cheese requiring longer brining time is Parmesan, which is brined for 72 hours.

After the cheese has been brined, the cheese blocks are removed from the brining tanks for further processing or are taken to storage for ageing.

The prior art brining system described requires handling and moving blocks from mold to brine tank, and from brine tank to further processing.

It is an object of the invention to eliminate much of the handling of the cheese block now required. It is also an object of the invention to perform the required brining in any available room to eliminate the separate refrigerated brining room.

SHORT SUMMARY OF INVENTION

Applicant's invention comprises a shallow tank containing an open channel conduit, comprising rows of parallel conduit runs and two types of conduit ends. Chilled salt brine is circulated from entrance to exit of the conduit to cool and brine the cheese. The brine transports the cheese to a processing station, without handling. Brining is not performed in a refrigerated room, but is performed as the cheese block moves from molding to a processing station.

Chilled salt brine is pumped into the entrance of a conduit comprising a series of connected parallel conduit runs. The brine is salt saturated to a concentration where the brine will float or suspend the type of cheese being processed. The floating block is moved along the conduit by the brine current. Dwell time or brining time of the cheese block in the conduit is determined by the speed of movement of the brine in the conduit and by the length of the conduit.

As the block moves along the conduit from entrance to exit, fresh chilled brine is introduced through jets on the bottom of the conduit. The introduction of fresh brine into the conduit from jets mounted on the bottom of the conduit, and the change of velocity of the brine flow induced by brine velocity varying devices mounted along the bottom of the conduit, continuously mixes the brine in the conduit, preventing the formation of non-uniform temperature gradients in the chilled brine.

As the block moves along the conduit, fresh chilled brine is either sprayed on that part of the cheese block extending above the brine surface or is sheeted on the moving block.

Corners or ends of one type of conduit are reversing corners where brine flow and the blocks are moved through 180 degrees from one parallel conduit run to another. C-shaped inserts in the reversing corners are designed to decrease the area of brine flow through the corner to increase the velocity of the brine and of the suspended block in the corner, and to eliminate jamming of the blocks at the ends of conduit runs.

A slotted elevator conveyor at the end of the conduit allows brine to pass through the conveyor to a brine outlet, while the cheese blocks are elevated by the conveyor out of the conduit.

Two types of conduit ends are used; one type of end creating continuous serpentine conduit using 180 degree reversing ends, and an end using a gated conduit. A gated conduit is used to brine cheese that requires long brining and where it would be impractical to make a continuous serpentine conduit long enough to provide the appropriate cheese block dwell time in the conduit or when the length of the cheese block precludes use of a serpentine conduit.

The conduit can be of unlimited length and sections of conduit can be stacked one above the other.

In a continuous serpentine conduit system, the length of the conduit and the velocity of the brine flow through the conduit is such that the brining time of the block from entrance to the conduit to the end of the conduit, with continuous forward movement of the block, is the desired brining time for the type of cheese being processed. In a gated conduit dwell time is increased by gates which stop continuous forward movement of the cheese block while allowing brine flow to continue.

BRIEF DESCRIPTION OF THE DRAWINGS

Drawing 1 is a schematic of a brining device combining a serpentine conduit and a gated conduit.

Drawing 2 is a schematic of a brining device showing a gated conduit and a serpentine conduit; a system which allows cheese with different required brining times to be processed in the same system.

Figure 1:
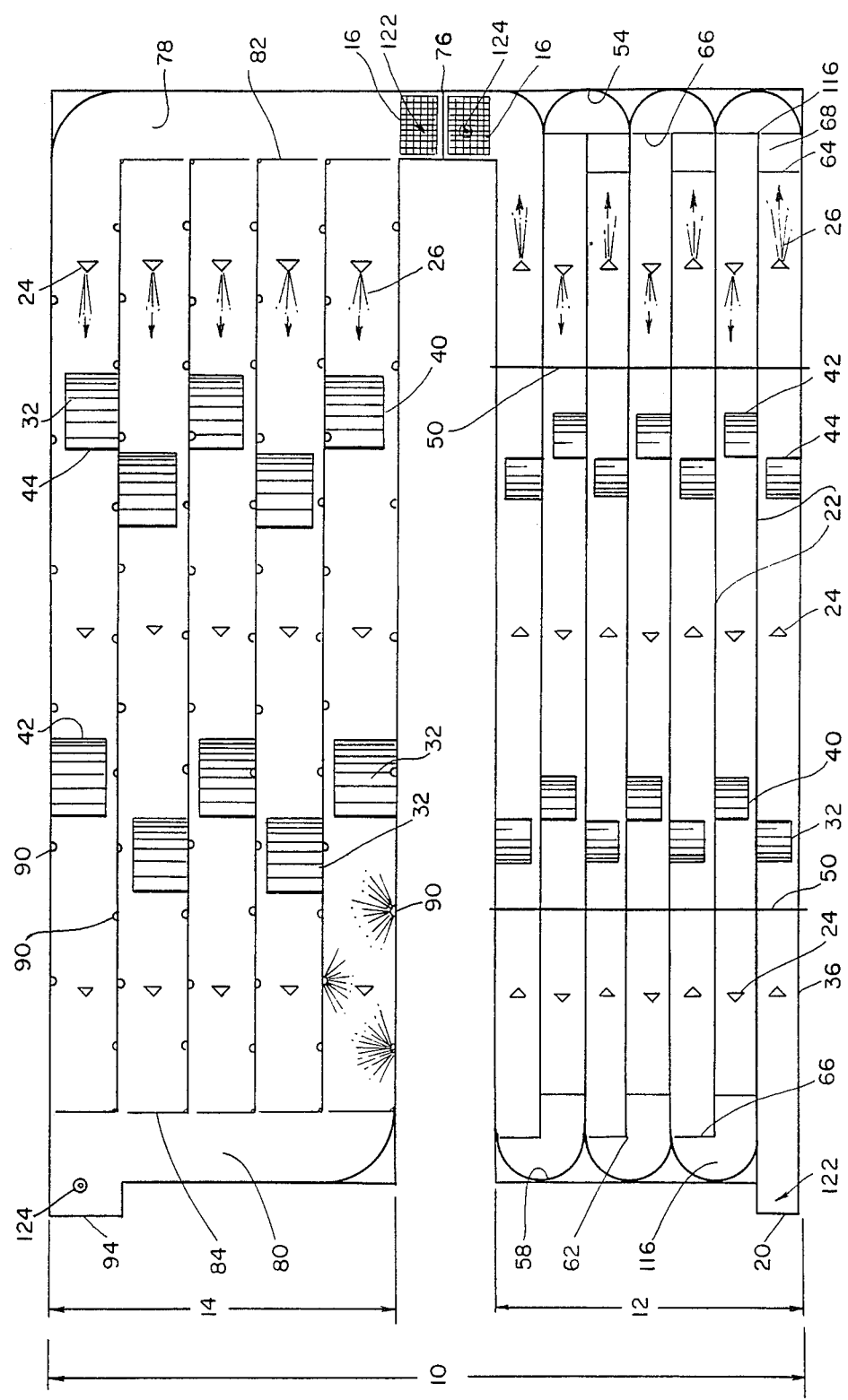

Drawing 3 is a section taken through a conduit showing side walls of a conduit and a brine sheeting device.

Drawing 4 is a perspective view of a cheese brining device sectioned at the front corner.

Drawing 5 is a section through the cheese brining device showing ramps used to vary brine flow along the conduit.

Drawing 6 is a section through the conduit showing elevator used to move the cheese block from one system to another.

Drawing 7 is a schematic showing tank brine cleaning and refrigeration.

DESCRIPTION OF THE PREFERRED EMBODIMENT

The elements of the invention comprise:
Brining Tank 10
Side Walls 11
Serpentine Conduit 12
Gated Conduit 14
Transfer Elevator 16
Cheese Block 18
Entrance 20
Parallel Conduit Run 22
Brine Inlet Nozzle 24
Jet or Brine Stream 26
Downstream Side of Block 28
Direction of Brine Flow 29
Following Block 30
Velocity Varying Ramp 32
Bottom of Conduit 34
Side of Conduit 36
Opening or Slot 40
Upstream End of Ramp 42
Downstream End of Ramp 44
Perpendicular Drop 46
Brine 48
Sheeting Brine Insertion Device 50
Cheese Block portion Extending Above Brine Surface 52
180 Degree Reversing Corners 54
Corner Brine Flow Varying Device (C-shaped Insert) 56
Outside of Reversing Corner 58
Slot 60
Inside of Reversing Corner 62
Upstream End of Corner Brine Flow Device 64
Downstream End of Corner Brine Flow Device 66
Ramp 68
Turbulent Flow 70
Transfer Point or Dam 76
Entrance Run 78
Exit Run 80
Upstream Full Gate 82
Downstream Half Gate 84
Gated Conduit Brine Sprayers 90
Exit 92
Exit (FIG. 2) 92 and 94
Conduit Wall (middle section covered with fiberglass and gel coat 96
Conduit Base 98
Corner Rounding Inserts 100
Fiberglass Cloth 102
Resin Coat 104
Gel Coat 106
Legs 110
Brine Height 114
Highest Point of Flow Varying devices 116
Area of Low Speed Brine Flow in Slot in reversing corner (follows slot 60) 120
Brine Inlet 122
Brine Return 124

A brining tank using a serpentine conduit refers to a parallel conduit run combined with a 180 degree reversing corner, to direct brine flow, hereafter called a serpentine conduit or serpentine conduit system.

A brining tank using a gated conduit refers to a parallel conduit using a series of gates combined with entrance and exit runs to direct brine flow, hereafter called a parallel conduit or parallel conduit system.

Drawings 1 and 2 show how the serpentine conduit and the gated conduit are used in combination.

Drawing 1 is a schematic which shows a tank 10 having a bottom and side walls 11 in which a serpentine conduit 12 and a gated conduit 14 are connected by a transfer elevator 16. The tank 11 is filled with brine 48. Brine is pumped into one end of the tank and is pumped out the other end. The brine current is directed within the tank by internal conduit and flow directing devices.

At entrance to serpentine conduit 12, molded cheese block 18 is dropped into the conduit as block 18 is ejected from a mold.

Figure 2:
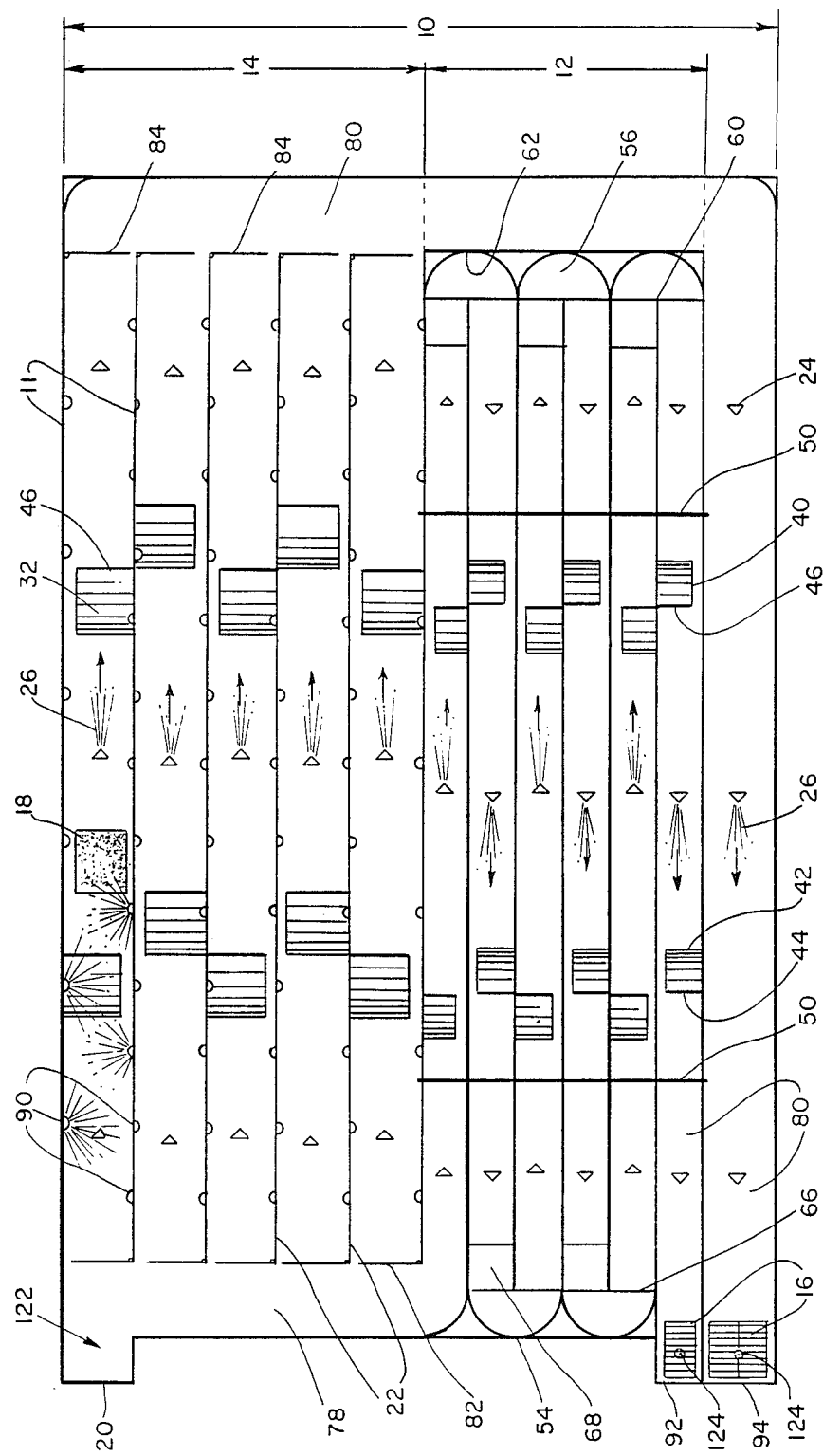

Brine flows into the system from entrance 20, flows along parallel conduit run 22. The block 18 is carried along conduit run 22 by the brine current; lock 18 passes over brine inlet nozzle 24. In FIGS. 1 and 2, which are schematics, brine inlet nozzles are indicated by triangles located in the conduit. The point of the triangle indicates direction of flow.

The jet 26 of refrigerated brine from nozzle 24 impinges on the downstream side 28 of block 18 pushing the block forward, away from following block 30, not shown.

As block 18 continues moving along the conduit, transported by brine flow, the brine with its suspended cheese block 18 passes over velocity varying ramp 32. The ramp decreases the area of the conduit, speeding up brine velocity.

Velocity varying ramp 32 is affixed to the bottom of the conduit 34 and to one side of the conduit 36. Velocity varying ramps 32 are alternated one side to the other of the conduit to help break up laminar flow of the brine.

An opening 40 or slot 40 between the side of the ramp 36 and the side of the conduit 36 allows conduit 34 to be drained.

The upstream end of the ramp 42 is faired into the surface of the bottom of the conduit. The downstream end of the ramp 44 terminates in a perpendicular drop 46.

As stated, as the brine 48 passes across the ramp, brine velocity increases because it is passing through a narrower area. Hydraulic lift is provided to the block 18 by the ramp 44 and block 18 speeds up and away from following block 30.

Along the conduit are mounted sheeting brine insertion devices 50. These are mounted, for example every four feet. The devices 50 sheet brine over the block 18 covering that part of the block surface 52 extending above the brine with brine and adding cold, fresh brine to the conduit at the same time.

As shown in FIG. 1, C-shaped brine flow velocity varying devices 56 are placed in the reversing corners 54.

The devices are faired into the bottom of the conduit 34 and are affixed to the outside of the reversing corner 58. Slot 60 is left between the C-shaped flow varying device 56 and the inside 62 of the reversing corner to allow the conduit to be drained.

The upstream end of the device 64 extends into the parallel conduit.

The device ramps 68 up to a flat surface 116 shallower than the rest of the conduit. Ramp 68 directs the brine flow smoothly up to the surface, providing lift to the block; because the corner is of less area than the rest of the conduit, brine velocity through the corner is increased.

Downstream end 66 of the device 64 is a perpendicular drop to the conduit bottom. The drop causes turbulent flow of the brine at 70.

With the hydraulic lift and the increased speed of the brine in the reversing corner caused by decreasing the area of brine flow in the corner, the forward momentum of the block towards the end of the conduit is overcome and the block 18 is rapidly turned through the corner.

Figure 6:
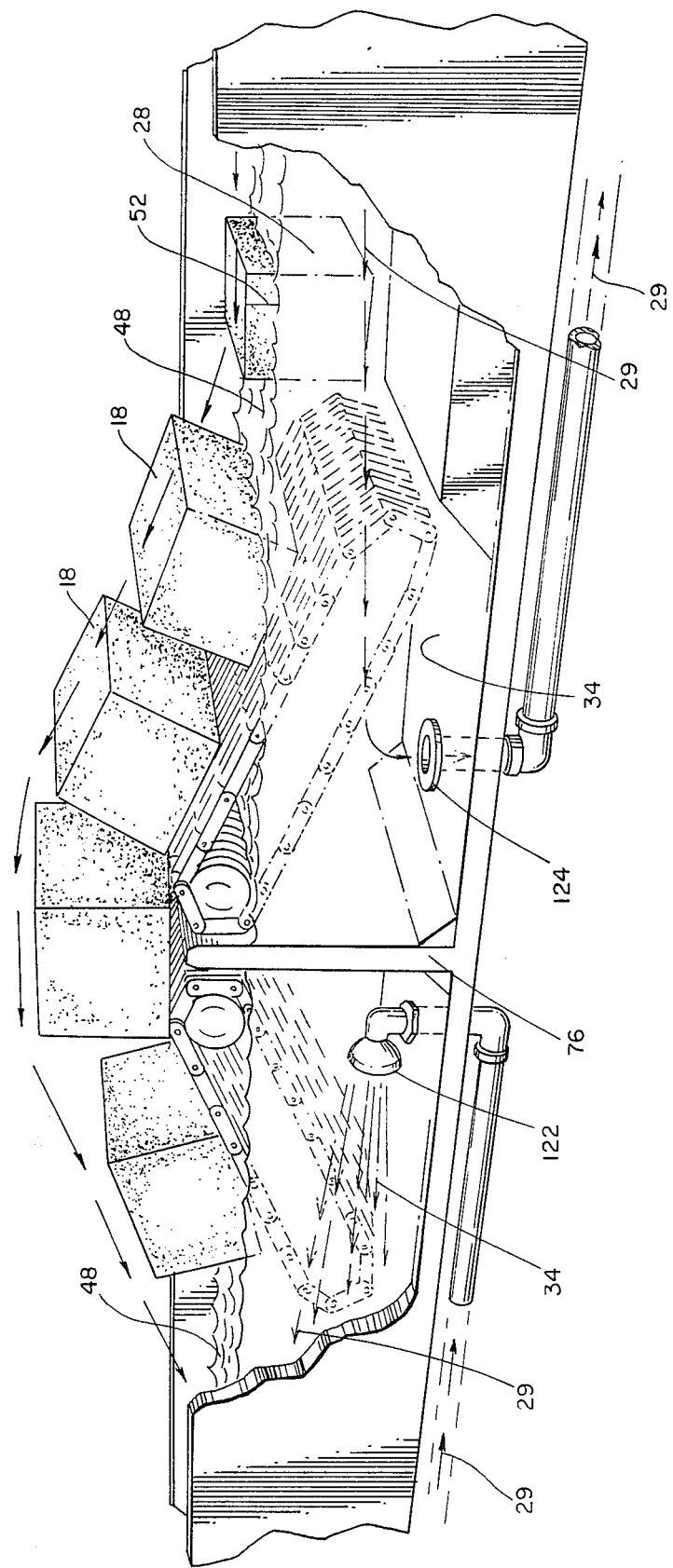

At the end of the serpentine conduit 12 in FIG. 1 is shown elevator 16. Brine return 124, best seen in FIG. 6, is mounted under and behind the elevator so brine flow pulls the block onto elevator 16.

Block 18 is transferred to the gated conduit at transfer point or dam 76.

Cheese blocks are entered into the serpentine conduit 12 in FIG. 1 at 20.

Gated conduit 14 comprises an entrance run 78 an exit run 80 and a series of parallel conduit runs 22. The gated conduit system doesn't use 180 degree reversing corners so C-shaped brine velocity varying devices 56 are not needed at the ends of parallel conduit runs 22.

In FIG. 1, after transfer by elevator 16 from the serpentine system 12 gate 82 is pivoted into the brine flow or current; downstream gate 84 is closed or left closed. Block 18 is forced by the moving current of brine into conduit 22. Block 8 and following blocks move into parallel conduit 22 until stopped or restrained from further downstream movement by gate 4. When the first parallel conduit run 22 is filled with cheese blocks, gate 82 is pivoted closed, and next gate 82 is opened. Brine flow carries block 18 into the next parallel conduit run 22 until that run is filled. The balance of the parallel conduits are filled with cheese blocks.

Cheese block 18 is retained by half gate 84 and is held in the moving current of brine 86 for the required brine time.

The block, and its following blocks, while held in the parallel conduits, are sprayed by low pressure brine sprayers 90 which spray overlapping semi-circles of brine across the conduit to ensure all surfaces are brined.

After the required dwell time or brine time, gate 84 is opened, as is full gate 82. The current flow through the parallel conduit 22 carries the cheese block out to exit run 80, down exit run 80 and to the exit of the device 94.

FIG. 2 shows a brining tank which allows two types of cheese, each with a different brining time to be processed. A long brine dwell time cheese is held in a gated conduit system 14, the entrance run 78 of the gated conduit system 14 also serving as the entrance to a serpentine conduit system.

Full gates 82 and half gates 84 in the gated conduit system 14 provide entrance to and exit from the parallel conduit runs.

A single entrance 20 and two exits 92 and 94 are shown in FIG. 2.

While the long brining time cheese is held in the gated system, continuous production of short brining time cheese passes through the serpentine system.

Figure 3:
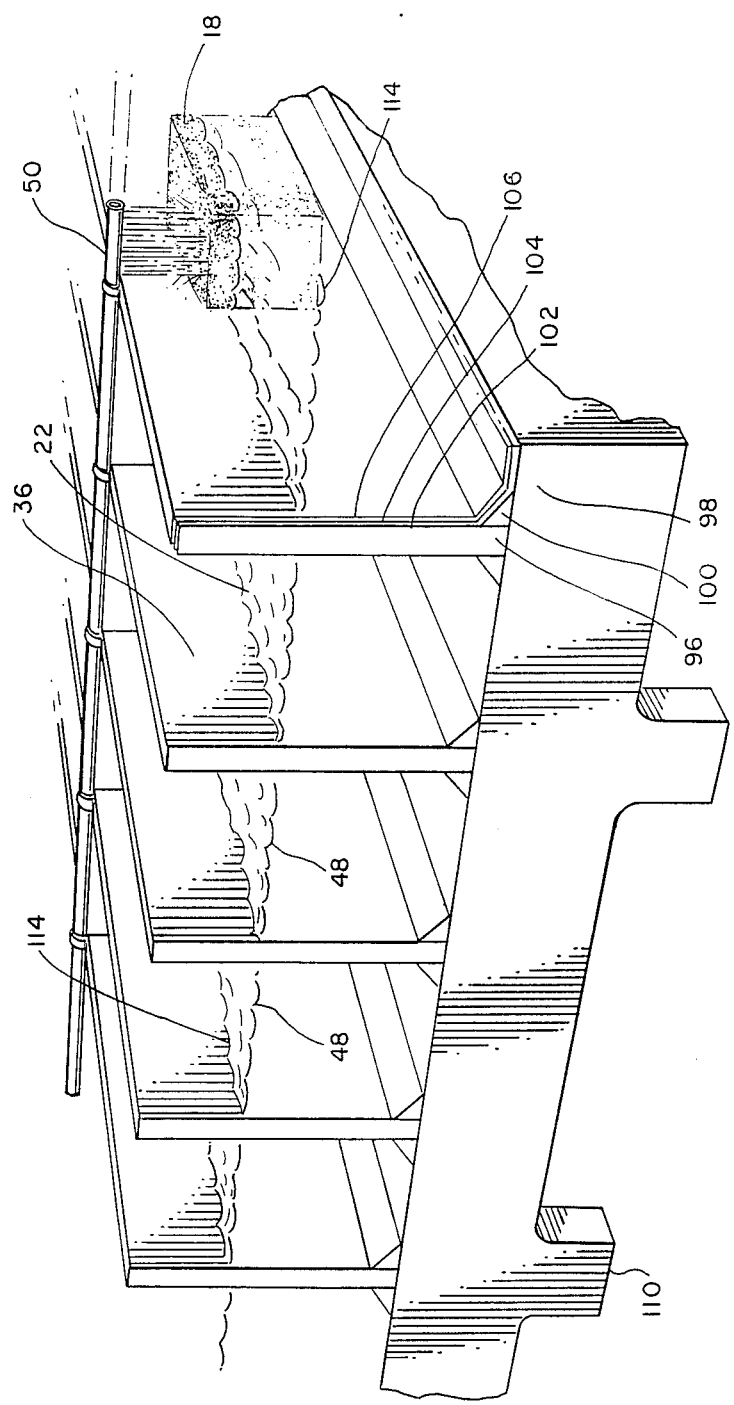

FIG. 3 is a section taken through a parallel run of a serpentine conduit.

Conduit wall 96 is affixed to conduit base 98; inserts 100 eliminate square corners which would be bacteria growth areas.

Fir plywood base 98 and walls 96 are covered with fiberglass cloth 102. A resin coat 104, then a food grade gel coat 106 is applied.

The brine sheeting device 50 used to wet the top surface of the moving cheese block is shown in FIG. 3. Brine sheets out of a slot in device 50.

Figure 4:
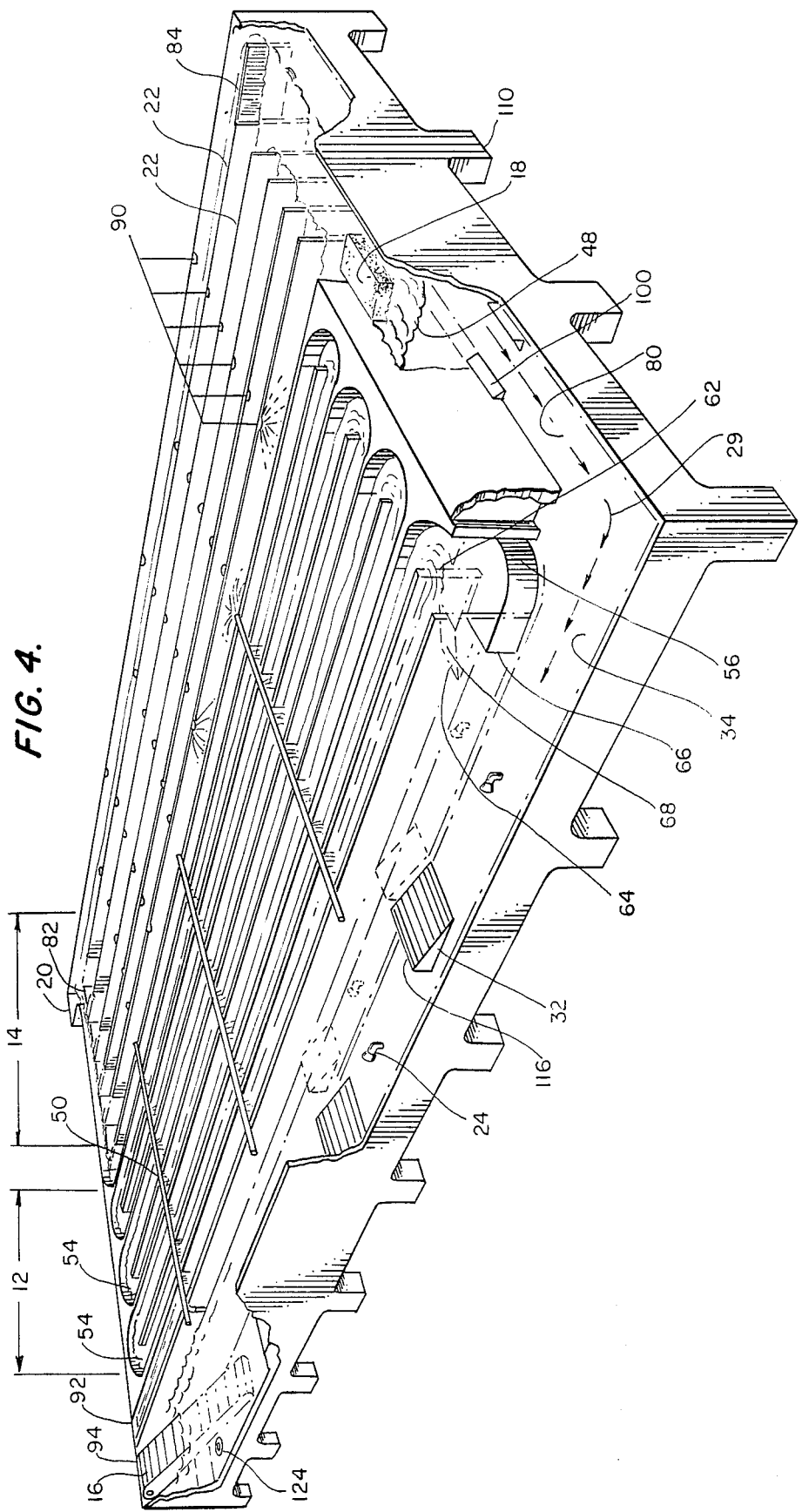

FIG. 4 is a perspective view with a section taken out of three corners, showing the combination gated conduit, serpentine conduit device of FIG. 2 in more detail.

Base 98 and legs 110 support tank 10 with its enclosed serpentine conduit 12 and gated conduit 14.

Brine height 114 and a suspended cheese block 18 are shown. The block is shown suspended much higher above the brine surface than the block would be, for purposes of illustration.

Half gates 84, in the gated conduit system, are shown in the upper right corner of FIG. 4. Inserts 100, round the line of connection of the conduit walls 96 of the conduit to the base or conduit bottom 98.

Figure 5:
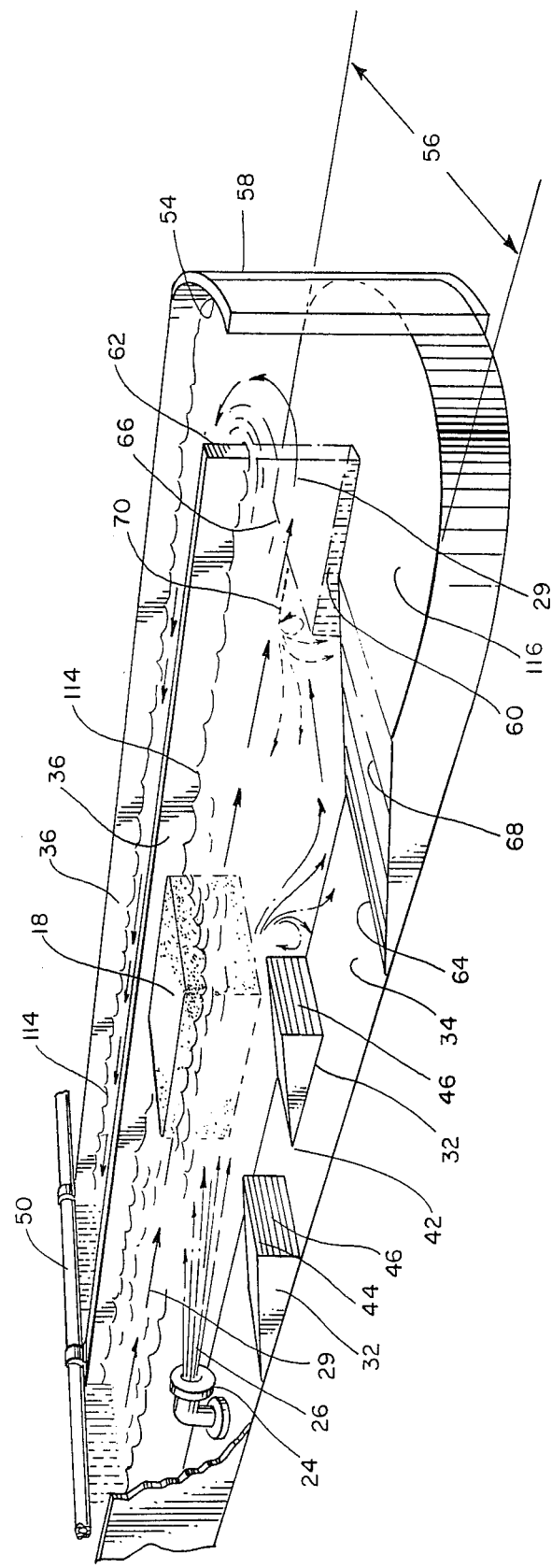

FIG. 5 shows brine velocity varying devices used to vary the area of the conduit to increase brine velocity.

The velocity varying devices are closer together in FIG. 5 than would be the case in actual use, for purposes of illustration. The devices extend upward, at their highest point 116, to within approximately two inches from the base of the suspended block 18.

Device 24 is a brine inlet nozzle. Cold brine is jetted 26 upward and forward into the moving brine in the direction of brine flow by nozzle 24.

Flow varying device 32 is made in the shape of a ramp. The downstream end of the ramp 44 is faired into the bottom of the conduit. One side of the ramp is spaced away from one side of the conduit 36. (Conduit side 36 is the conduit wall 96 except that 36 is the completed fiberglassed and gel coated side).

The ramp is formed in a wedge shape. The height 118 of the ramp 44 as stated, extends upward towards cheese block 18. The downstream end of the ramp 44 drops off perpendicularly to the bottom of the conduit 34 to create turbulent flow.

At the reversing corner 54 of the conduit, a second flow varying device 56 is used.

C-shaped insert 56 fills the reversing corner 54 except for a slot 60 at the end of the wall of parallel run 22.

The device 56 reduces the depth of the corner to a depth two inches greater than the depth of the suspended block.

Slot 60 allows the conduit to be drained, and also provides an area 120 of low speed brine blow along the inside of reversing corner 62. This low speed area, in combination with the higher velocity of the brine in the balance of the reversing corner, causes the block to hug the inside corner in making its turn through the 180 degree reversing corner.

Ramp 68 increases brine velocity and directs brine flow smoothly upward prior to entering the reversing corner and provides hydraulic lift to the block.

FIG. 6 shows transfer elevator 16 moving cheese blocks 18 from one system to another.

Brine inlet 122 and brine return 124 are shown, as is the dam 76 or wall between the two systems.

Figure 7:
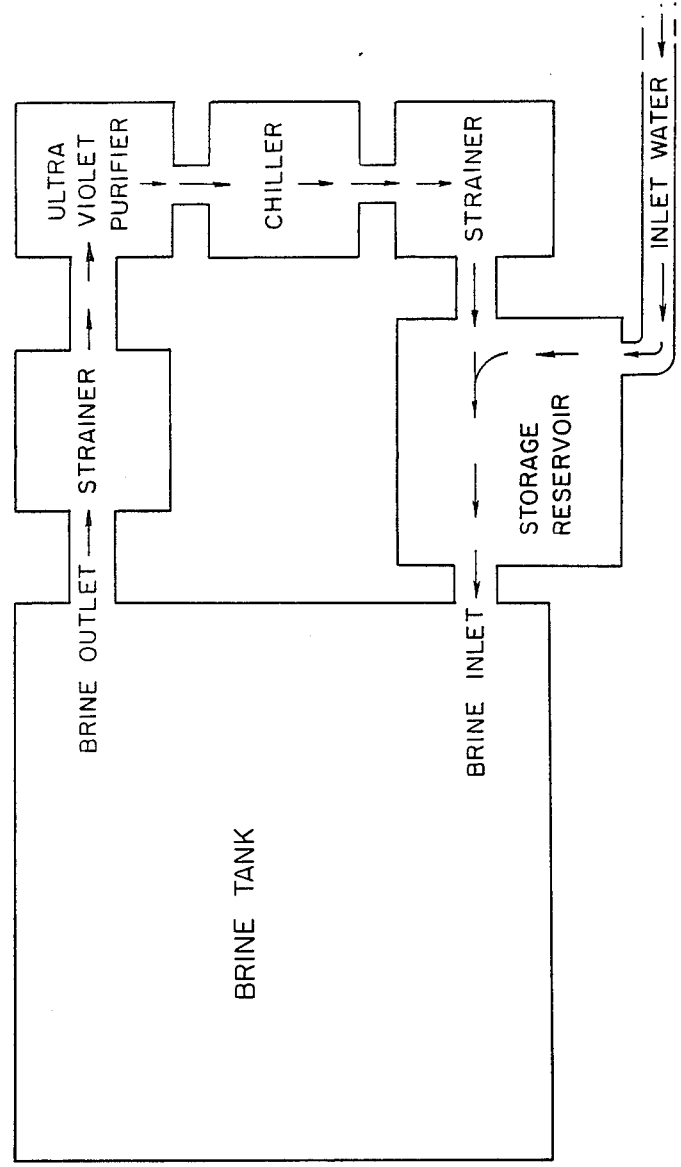

FIG. 7 is a schematic showing flow in and out of the tank 10, and in and out of the brine cleaning and chilling system. Fresh water enters into a reservoir loaded with the required amount of salt, passes into the tank 10, is directed through the tank; the brine is pumped out through a strainer, an ultraviolet purifier, across a chiller and then a second strainer. The brine then goes back into the reservoir to be pumped back into the tank.

BEST METHOD

The Brine

The invention uses a current of refrigerated salt brine moving in an open conduit, to float and transport a hot molded, cheese block, to add salt to the cheese block to remove internal moisture, to add salt to the block for taste and to reduce the temperature of the block from molding temperature to processing temperature.

Salt brine chilled to 38 to 42 degrees Fahrenheit, at a concentration of 90 to 95 percent saturation, is pumped into the conduit at 175 to 350 gallons per minute. The brine salt concentration is adjusted so that the cheese block floats above the surface of the brine.

Brick cheese, Muenster cheese, Swiss cheese, Provolone cheese, and Blue cheese vary substantially in density. The density of brine required to float the cheese block for each type of cheese is determined empirically; the density of brine is then measured by a salinometer. Sodium Chloride is regularly added to the brine, in an operating system, to maintain the required salt density, as salt is absorbed from the brine by the cheese.

Chilled salt brine is introduced into the conduit at the entrance to the conduit. Also at intervals along the conduit bottom, below the floating cheese block, fresh chilled brine is forced into the conduit.

Chilled brine is also either sheeted down on the moving block in a serpentine conduit system or is sprayed on stationary cheese blocks in a gated conduit system.

Low pressure is used to pump the sheeting brine or the sprayed brine, to keep the highly corrosive brine within the tank.

In certain applications, super cooled brine, chilled to 10 to 28 degrees Fahrenheit is used. Super cooling is used as in Drawing 1, to quickly harden a large block of cheese so it can be handled, or to allow a shorter length conduit to be used.

Corrosion by brine is increased by the presence of oxygen, air or carbon dioxide. The corrosive effect of the brine is further increased by movement of the brine. To deal with the corrosive effect of the brine, all conduit, brine contact surfaces, are covered with an inert epoxy or are made of corrosive resistant materials that meet United States Dairy Administration Codes.

For example, a conduit liner is used which is a white epoxy gel coat meeting USDA food contact surface code. A suitable USDA approved gel coat is a polyester product containing styrene and or vinyl toluene and or acrylate monomers made by "Coatings and Plastics Inc." of Fort Smith, Ak. 72901. Hinges on gates are stainless steel. Elevators are nylon or some other material such as polypropolene, having properties of resistance to brine corrosion and to commonly used cleaning solutions.

THE CONDUITS

Two types of conduit ends are used; in this application they are designated by the names serpentine conduit and gated conduit. By building each system with serpentine or gated conduit or with a combination of both, a large number of different types of cheese, each requiring different brine dwell times can be processed.

MAKEUP OF THE CONDUITS

The conduits are built of fir plywood. Fir plywood is resistant to warping over the large surfaces used in this brining device.

A layer of mesh fiberglass is used to cover the conduit surfaces, then a resin coat is applied to adhere the mesh to the plywood. A USDA approved food contact surface gel coat is applied over the resin coat.

Conduits are mounted parallel to each other to minimize floor space requirements. To further minimize floor space used, conduits can be mounted one above the other. When conduits are mounted one above the other, transport elevators are used to move the block at the end of the conduit up or down to the next conduit.

The width of the conduit is determined by the width and length of the cheese block, ejected from the molder. The width must be wider than the block to be processed. Generally the conduit is made two inches wider than the width of the block to be processed. Exceptions to this width dimension are discussed under specific examples.

The depth of the conduit is determined empirically. The depth must be such that a floating cheese block does not contact ramps mounted within the conduits to vary flow, or contact refrigerant injectors. The bottom of the floating cheese block should, for best operation, be approximately two inches above the ramps and injectors.

Depth of the conduit is determined by the size of the cheese block.

A cheese block 8 inches deep × 10 inches wide by 20 inches long, weighing 20 lbs., of mozzarella, would extend approximately eight inches below the surface.

Conduit sides are four inches above unloaded brine height.

Corners of the conduit, at the point where the sides and bottom of the conduit meet, are rounded to eliminate the square corner to meet USDA requirements that no food trapping or bacteria growth areas exist in the system.

SERPENTINE CONDUIT

The first type of conduit to be discussed is a serpentine conduit. In the serpentine conduit system, parallel runs of open conduit with 180 degree reversing ends, run continuously from entrance of the system to exit.

The liquid chilled brine flows, with a free surface, subject to constant atmospheric pressure, in open channel flow. The distance between the liquid surface and the bottom of the channel is called the stage [see Marks Mechanical Engineers Handbook, Eighth Edition, 3-47].

When liquid flows in a channel of uniform cross section and the slope of the surface is the same as the slope of the bottom of the conduit, flow is said to be uniform. When the cross section of the channel changes, the liquid flow is said to be varied.

In the serpentine conduit shown, flow varies at chilled brine input devices, at ramps and at corners.

In a serpentine conduit, several problems must be addressed.

Cheese blocks must be kept separated and prevented from bumping sides or corners of the conduit. Jamming at the reversing corner occurs, if flow is not speeded up at the corners. At the reversing corners, the blocks must overcome forward momentum and turn 180 degrees to the next parallel conduit run. Without some mechanism to speed the blocks through the corner stagnation velocity occurs. The blocks then jam.

In the early stage of chilling, the blocks are soft; bumping together or bumping the wall can nick or mar the block requiring trimming.

THERMAL EFFECTS

Uniform brine flow through the conduit results in undesired thermal gradients measured from top to bottom of the brine along the conduit.

Since the device is used in an unchilled room, if flow is not made turbulent at points along the conduit, surface temperature of the brine is higher than is the temperature of the brine in the bottom of the conduit. As heat is absorbed from the cheese block, warming the brine, temperatures further stratify.

An unacceptable temperature rise develops from entrance to exit of the system, when there is uniform flow of the brine without addition of fresh chilled brine at points along the conduit.

To reduce thermal gradients and to separate the blocks as they move through the system from entrance to exit, adjustable brine injection nozzles are used to insert cold fresh brine upward from the bottom of the conduit. The fresh brine is jetted in an upward pointing stream towards the cheese block and in the direction of brine flow. The jet of brine impinges on the block and moves the block away from the following block.

In the best method, brine inlet jets are located approximately every eight feet from the entrance of the device to the end.

Volume of brine introduced by each jet is varied by the operator; the appropriate volume introduced through each jet is determined by size of the cheese block, the location of the jet along the conduit, and by how fast it is desired to move the cheese block through the system.

The brine jets along the conduit bottom at the entrance to the device generally are set to inject less chilled brine than the jets at the end of the device.

Brine velocity varying devices in the form of ramps are located every eight feet along the conduit, beginning four feet from the first jet. The ramps are attached to the bottom of the conduit and to one side of the conduit and are fixed alternately to one side or the other of the conduit. A ramp does not extend fully across the conduit. A slot running to the bottom of the conduit along the side of the velocity varying ramp allows the conduit to be drained for cleaning.

Ramps are designed to extend upward into the conduit to within approximately two inches of the base of the cheese block.

The ramp causes the flowing brine in the conduit to mix and to reduce stratification. Ramps are slanted from upstream from point of beginning at the conduit bottom upward along the ramp to the top of the ramp. The end of the ramp is a perpendicular drop, to create turbulent flow of the brine downstream of the ramp, causing the brine to mix.

The movement of the brine up the front of the ramp provides a hydraulic lift to the block. Varying the stage increases the velocity of the brine above the flow varying device. As a result of the lift and varying the stage, the cheese blocks separate from each other. To an observer, the block appears to move rapidly away from the following block.

At reversing corners, in serpentine conduit systems, are brine velocity varying devices in the form of a C-shaped insert with an upstream ramp. The upstream end of the insert is a ramp. The insert is flat and extends upward to within approximately two inches of the cheese block. A perpendicular drop at the end of the device creates turbulence to mix the brine downstream of the device.

As stated, reversing corners are troublesome in open conduit transport, where an immersed object is transported by hydraulic flow. If the hydraulic pressures on the cheese block are not such as to overcome momentum and to speed the block through the corner, the stagnation point or stagnation pressure is reached. At the stagnation point, an open conduit simply jams up with blocks of cheese.

By reducing the stage and providing lift, the cheese block rapidly turns through this area.

GATED CONDUITS

Cheeses that require long brine times are brined in gated conduits. Cheeses of such odd sizes that make building a serpentine impossible are also brined in a gated conduit. For example, a cheese block longer than approximately twice the width of the conduit would jam in a 180 degree reversing corner.

WHAT IS A GATED CONDUIT

A gated conduit is an open conduit in which brine is passed continuously from entrance to exit. Cold brine is forced into the bottom of the conduit as in the serpentine conduit; cold brine is sprayed on the block from the top. The cheese block is held stationary in the moving chilled brine; the block being held by a retaining gate for the required brining time.

Cold brine insertion jets located every eight feet along the bottom of the conduit, inject cold brine into the conduit. Overhead spray of chilled brine along the surface of the parallel conduit run, and brine velocity varying ramps every eight feet are also used in the gated conduit.

At the entrance run of the gated conduit a door reaching from top to bottom of the conduit is used to direct brine flow. This door is located at the leading or upstream end of the parallel conduit. At the other end of the conduit is a short door extending into the conduit far enough to prevent the cheese block from passing out of the end of the parallel conduit to an exit run. Brine flow continues through the parallel conduit across the cheese block held back by the gate.

A gated conduit system comprises an entrance run, an exit run, and generally perpendicular to the entrance and exit runs, a series of parallel gated conduit runs.

In loading the gated conduit, the entrance door to the gated run is opened and swung into the entrance run. Cheese blocks float into the gated run until blocked by the downstream gate.

When the parallel gated run is filled to capacity, the first gate is closed, sealing off the cheese blocks to be held in the conduit while brining; the next gate is then opened to the second parallel run loading it with cheese; the process of loading continues until are gated conduits are filled.

The blocks are held in the parallel gated runs, in the moving brine solution for the required brining time.

To unload, the first gate is opened, the downstream gate is opened and brine flow carries the cheese blocks into the exit run to the end of the system.

Usually a gated conduit system is made large enough to hold eight hours production time of brined cheese.

OPERATING THE SYSTEM

Fresh, chilled brine is introduced into the conduit at (1) the entrance to the conduit by an entrance pump; (2) along the conduit, through brine injector nozzles; and (3) from the top of the conduit by overhead spray or sheeting.

The brine passes through the conduit to an exit point or drain.

At the drain, the warmed, depleted brine is pumped through a rotary drum strainer, then through an ultra violet purifier. The strainer removes debris from the brine and the purifier kills bacteria in the brine.

The cleaned brine passes over a fall film chiller. This type of chiller is a device that comprises a chilled stainless plate cooled by ammonia. The brine passes over the plate and heat in the brine is absorbed into the ammonia solution, through the plate, chilling the brine; many other types of chillers can be used to chill the brine.

The chilled brine is passed through an angle bank strainer and into a displacement tank which acts as a reservoir.

An electrical on-off switch is attached to an auxiliary pump, to maintain brine level constant in the conduit. When the brine level rises high enough in the conduit to contact the switch, which is located in a conduit wall, an auxiliary pump is engaged which increases the amount of brine removed from the system.

Generally, the brine switch and pump is located at the center of the tank where brine height tends to be the highest.

Most systems use 350 to 400 gallons per minute input of brine; 200 gallons per minute, of the 400 gallons per minute, put into system, goes in at the entrance, 150 gallons per minute is inserted through the jets and the balance of the brine goes into the system through the overhead sprayers.

EMPTY OF CHEESE, LOADING WITH BRINE BRINING SYSTEM

A specific example: a serpentine brining system having ten runs; a system designed for brining a 20 pound block 8 inches deep, 10 inches wide and 20 inches long for four hours; the system would hold 5,000 gallons of brine.

The brine would be produced by putting appropriate amount of salt into the displacement tank and then putting fresh unsalted water into the displacement tank dissolving the salt; as the displacement tank fills, its contents are pumped into the brining tank, with the exit pump shut down, until the brining tank is filled to the desired height.

LOADING WITH CHEESE BLOCKS

As cheese blocks are added, the height of the brine solution in the conduit rises; increase in brine height raises the cheese block above the optimum two inch displacement of the block from the brine velocity varying ramp.

An electrical brine contact switch on the side of the conduit operates to start an overflow pump which pumps excess brine out of the center of the tank, or if a smaller system out of the system by a separate pump by the main exit and pumps the excess brine back into the displacement tank.

SPECIFIC EXAMPLES

Single Serpentine System

A short dwell time brining cheese, of average dimensions such as a 20 pound block of mozzarella, dimensions 8 inches deep by 10 inches wide and 20 inches long to be brined for four hours, would require about 600 lineal feet of conduit; the volume of brine passing through the system would be adjusted to a velocity which would move the cheese block 150 feet per hour, at an inlet brine temperature of 48 degrees Fahrenheit. At the end of the four hours dwell time in the conduit, from entrance to the system to exit of the system, the block would be brined and its center temperature reduced from 120 degrees fahrenheit at entrance to 55 degrees Fahrenheit at exit.

TWO SERPENTINE SYSTEMS COMBINED

Six hundred lineal feet of conduit, using parallel conduit runs 50 feet long requires six hundred square feet of floor area. The required floor area could be reduced by using a two level system with 300 square feet of floor area.

To reduce the required conduit length and floor area used, two serpentine conduits can be used, a first super cooled serpentine section with brine entrance temperature of 18 degrees Fahrenheit for 150 lineal feet; the first serpentine section would lower the block temperature substantially faster than would a single serpentine. After 150 feet of travel in the super chilled section, an elevator would be used to move the block to a second serpentine in which the inlet brine temperatures was set at 48 degrees Fahrenheit.

Except for the complication of having two systems and a transfer elevator, the same cooling could then be performed in less square footage, with 450 lineal feet, for example, at two different chilling temperatures and two different speeds of flow.

I claim:
1. A cheese block bringing device comprising:
    a. a brining tank comprising a base and upstanding walls defining an enclosure for a volume of sodium chloride brine;
    a cheese block to be brined;
    b. an open conduit, comprising a base and a plurality of generally parallel inner walls, within said tank, such parallel inner walls forming parallel conduit runs; such parallel inner walls being spaced apart a distance slightly greater than the width of a cheese block to be brined;
    c. a quantity of sodium chloride brine in a volume deep enough to suspend a cheese block in the brining tank; the specific gravity of a cheese block to be brined;
    d. a brine inlet for introducing chilled sodium chloride brine into the tank;
    a brine return for removing sodium chloride brine from the tank;
    e. a source of chilled sodium chloride brine;
    f. a pump operable to force chilled sodium chloride brine, into the tank, through the brine inlet, from the brine source, in such a volume as to maintain a generally constant brine height in the tank, as brine is drained through the brine return;
    means to insert a cheese block into the conduit, adjacent to the brine inlet;

g. brine flow directing means, operable to direct brine flow from the brine inlet into the parallel conduit runs and thereby to direct brine flow and a cheese block, placed in said tank, suspended in such brine flow, along a circumscribed path within the parallel conduit runs, through the tank, from brine inlet to brine return;

h. brine velocity increasing means mounted along the conduit, operable by decreasing the area of the conduit, to increase velocity of brine flow along the conduit;

i. brine injection means, operable to inject a stream of chilled brine into the conduit;

j. brine insertion means operable to insert chilled sodium chloride brine into the top of the conduit; means for varying the volume of brine pumped through said tank, operative to vary the velocity of brine flow between brine inlet and brine return, whereby the rate of transport of a cheese block through the tank can be varied;

k. cheese block extraction means located adjacent to the brine return, for engaging a cheese block and carrying it out of the tank.

2. The device as set forth in claim 1 wherein the brine flow directing means comprises:

a 180 degree reversing corner of curvilinear shape, the radius of curvature of such corner being the width of a parallel conduit run; such reversing corner extending across and bridging two adjacent parallel conduit runs, operable to direct brine flow out of one parallel conduit run, into the adjacent parallel conduit run.

3. The device as set forth in claim 2 further comprising:

a 180 degree reversing corner C-shaped insert, such insert extending upwards from the base of the conduit to decrease the area within the reversing corner, to increase brine velocity in the reversing corner; such insert extending from the outside of the reversing corner inward, toward, but short of the inner conduit wall, forming a passage extending upward from the base of the conduit between the insert and the wall, the upstream end of such C-shaped insert being of wedge shape; the downstream end of such C-shaped insert being generally perpendicular.

4. The apparatus inc claim 3 wherein the brine insertion means of claim 1 operable to insert brine into the top of the conduit comprises:

a plurality of sheeting brine insertion devices extending across the top of adjacent parallel conduit runs, such device comprising a pipe with slits formed therein above the parallel conduit runs, operable to sheet brine down on a moving cheese block as it moves along the parallel conduit run.

5. The device as set forth in claim 1 wherein the brine flow directing means comprises:

an entrance run for brine flow, a plurality of pivotally mounted gates, each of such gates being pivotable into the brine flow thereby directing brine flow into a parallel conduit;

an exit run for brine flow such exit run located adjacent to and terminating at the brine return;

a plurality of pivotably mounted gates each of such gates mounted across one conduit run, to retain a cheese block in the parallel conduit run while allowing brine to pass out of the parallel conduit run into the exit run, and being pivotable to allow a cheese block to pass out of the parallel conduit run into the exit run.

6. The apparatus in claim 1 wherein the brine velocity increasing means comprise:

a plurality of inserts affixed to the base of the conduit and to alternating sides of the conduit;

the upstream end of such inserts being faired into the base of the conduit, such insert tapering upwardly into the conduit;

such inserts extending partially across the conduit, being spaced apart from one conduit wall, forming a slot between the side of the insert and the conduit wall;

the downstream end of such insert dropping generally perpendicularly from the highest point of the insert to the conduit base, creating an area of turbulence downstream of the insert.

7. The apparatus in claim 5 wherein the bottom of the slots formed between the inserts and the conduit walls are generally parallel to and in the same plane as the base of the conduit allowing the conduit to be drained for cleaning.

8. In an apparatus for brining and chilling a cheese block of the type in which a cheese block is placed in a generally rectangular brine tank to be held for a period of time, while refrigerated brine is pumped into one end of the tank and pumped out of the other end of the tank, the improvement comprising:

a brining tank comprising a base and upstanding side walls defining an enclosure for a volume of sodium chloride brine, such enclosure having length and width;

an open conduit having an entrance and an exit, formed by a plurality of generally parallel inner walls, within said tank, such parallel inner walls forming parallel conduit runs; such parallel inner walls being spaced apart a distance slightly wider than the width of a cheese block to be brined; the length of such parallel inner walls being less than the length of the tank, forming an opening between the ends of the parallel inner walls and the side walls of the tank;

a cheese block to be brined;

sodium chloride brine in an amount that will suspend a cheese block in the tank; the specific gravity of such sodium chloride brine being greater than the specific gravity of the cheese block to be brined so that the block is suspended in the tank;

a brine inlet for introducing a stream of chilled sodium chloride brine into the tank located at the entrance to the conduit; a brine return for removing sodium chloride brine from the tank located at the exit of the conduit;

a source of chilled sodium chloride brine;

a pump operable to force a stream of chilled sodium chloride brine, into the tank, through the brine inlet, from the brine source, in such a volume as to maintain a generally constant brine height in the tank, as brine is drained through the brine return; brine movement between brine inlet and brine outlet causing brine flow;

brine flow directing means, located between the ends of the parallel conduit runs and the side walls of the tank, operable to direct brine flow into the parallel conduit runs and thereby to direct brine flow, with a suspended cheese block, in a circumscribed path through the tank from brine inlet to brine return;

means to insert a cheese block into the tank;

brine velocity increasing means mounted along the base of the conduit, operable by decreasing the area of the conduit, to increase velocity of brine flow at locations along the conduit;

brine injection means, mounted along the conduit, operable to inject a stream of chilled brine into the conduit;

brine insertion means operable to insert chilled brine through the top of the conduit;

an inclined elevator, partially submerged in the brine, at the brine outlet, for engaging a cheese block and carrying it out of the tank.

9. A cheese block brining device comprising:
a. an open conduit comprising a base and upstanding side walls for holding a volume of chilled sodium chloride brine at a predetermined level;
a conduit inlet for receiving cheese blocks;
a conduit outlet for discharge of cheese blocks;
b. the length of said conduit being variable to provide dwell time within the conduit adequate to brine and chill a cheese block; the width of said conduit being slightly wider than a cheese block to be brined;
c. a quantity of sodium chloride brine in a volume deep enough to suspend a cheese block in the conduit; the specific gravity of such sodium chloride brine being greater than the specific gravity of a cheese block to be brined so that the block floats in the conduit;
d. a source of cheese blocks to be brined;
e. means for inserting cheese blocks into the conduit cheese block inlet;
f. means for extracting cheese blocks at the conduit cheese block outlet;
g. a source of chilled sodium chloride brine;
h. a brine inlet for introducing chilled sodium chloride brine into the conduit, adjacent to the cheese block receiving inlet;
a plurality of brine nozzles mounted along the base of the conduit for introducing chilled sodium chloride brine, into the conduit;
a brine return for removing warmed sodium chloride brine from the conduit, to be chilled and returned to the conduit, such brine return located adjacent to the cheese block outlet;
a pump operable to force chilled sodium chloride brine into the conduit, through the brine inlet, and through the nozzles in such a volume so as to maintain a generally constant brine height in the conduit as brine is drained through the outlet; the volume pumped into the conduit and the volume drained out of the conduit being variable to create a current through the conduit from brine inlet to brine return, to transport the cheese block from inlet to outlet and to provide dwell time within the conduit adequate to brine and chill the cheese.

* * * * *